(12) United States Patent
Yan et al.

(10) Patent No.: US 12,236,341 B2
(45) Date of Patent: Feb. 25, 2025

(54) BANK-BALANCED-SPARSE ACTIVATION FEATURE MAPS FOR NEURAL NETWORK MODELS

(71) Applicant: Moffett International Co., Limited, Kowloon (HK)

(72) Inventors: Enxu Yan, Los Altos, CA (US); Dongkuan Xu, Los Altos, CA (US); Jiachao Liu, Los Altos, CA (US)

(73) Assignee: MOFFETT INTERNATIONAL CO., LIMITED, Kowloon (HK)

( * ) Notice: Subject to any disclaimer, the term of this patent is extended or adjusted under 35 U.S.C. 154(b) by 663 days.

(21) Appl. No.: 17/038,557

(22) Filed: Sep. 30, 2020

(65) Prior Publication Data
US 2022/0101118 A1    Mar. 31, 2022

(51) Int. Cl.
*G06N 3/08* (2023.01)
*G06N 3/04* (2023.01)

(52) U.S. Cl.
CPC ............. *G06N 3/08* (2013.01); *G06N 3/04* (2013.01)

(58) Field of Classification Search
CPC .................................... G06N 3/08; G06N 3/04
See application file for complete search history.

(56) References Cited

U.S. PATENT DOCUMENTS

| | | |
|---|---|---|
| 2019/0012170 A1 | 1/2019 | Qadeer et al. |
| 2020/0134461 A1 | 4/2020 | Chai et al. |
| 2020/0279133 A1* | 9/2020 | Baum ................. G06V 10/82 |
| 2020/0285949 A1 | 9/2020 | Baum et al. |
| 2022/0147791 A1* | 5/2022 | Yao .................. G06N 3/0495 |

FOREIGN PATENT DOCUMENTS

| | | |
|---|---|---|
| JP | 2018514844 A | 6/2018 |
| JP | 2018527677 A | 9/2018 |

OTHER PUBLICATIONS

Lee, Kwangbae, et al. "Flexible group-level pruning of deep neural networks for on-device machine learning." 2020 Design, Automation & Test in Europe Conference & Exhibition (Date). IEEE, 2020. (Year: 2020).*
Cao, Shijie et al.Efficient and Effective Sparse LSTM on FPGA with Bank-Balanced Sparsity. FPGA '19, Feb. 24-26, 2019, 10 Pages.

* cited by examiner

*Primary Examiner* — Markus A. Vasquez
(74) *Attorney, Agent, or Firm* — WOMBLE BOND DICKINSON (US) LLP

(57) ABSTRACT

Embodiments disclose bank-balanced-sparse activation neural network models and methods to generate the bank-balanced-sparse activation neural network models. According to one embodiment, a neural network sparsification engine determines a first deep neural network (DNN) model having two or more hidden layers. The engine determines a bank size, a bank layout, and a target sparsity. The engine segments the activation feature maps into a plurality of banks based on the bank size and the bank layout. The engine generates a second DNN model by increasing a sparsity for each bank of activation feature map based on the target sparsity, wherein the second DNN model is used for inferencing.

21 Claims, 10 Drawing Sheets

BANK-BALANCED-SPARSE ACTIVATION FEATURE MAPS FOR NEURAL NETWORK MODELS

TECHNICAL FIELD

Embodiments of the present disclosure relate generally to artificial intelligence. More particularly, embodiments of the disclosure relate to methods and systems for bank-balanced-sparse activation feature maps for deep neural network models.

BACKGROUND

Deep Neural Networks (DNNs) have become a widely used approach in Artificial Intelligence (AI) for extracting high-level information from lower-level data such as image, video, audio and text. However, expensive computational cost of DNN deters its use in applications with tighter budgets on energy consumption, storage space or latency tolerance, especially on edge devices such as mobile phones and surveillance camera.

The computational cost of DNN model comes from a variety of sources. First, the DNN model parameters can be in the order of millions or tens of millions, resulting in huge storage costs and can deter storage of the DNN model parameters in the memory space. Second, the number of neurons in a DNN model can consume a large memory space and may require billions of arithmetic operations during runtime. Third, search engines based on vector representations generated by neural networks, such as face comparison engines, can be computationally expensive, due in part to the high-dimensional dense vector representations (embeddings) of the DNNs.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
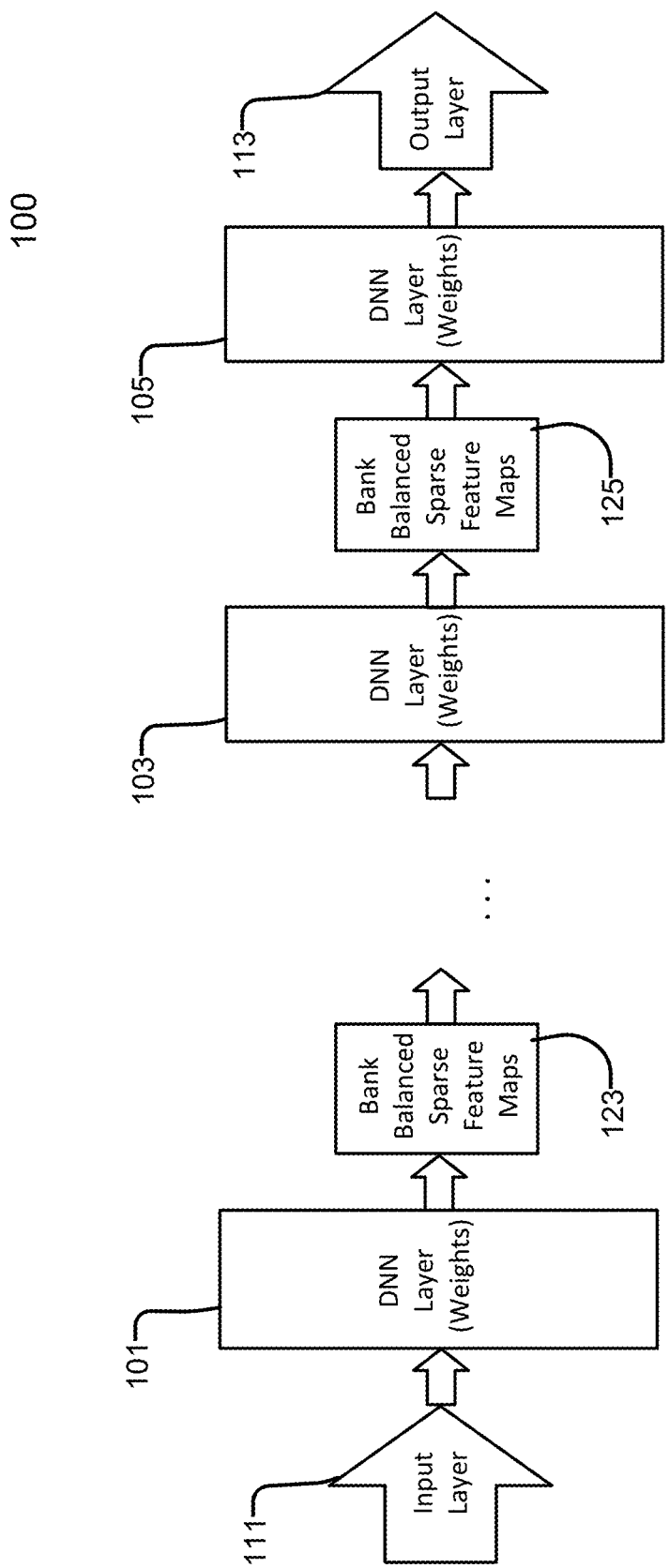
FIG. 1 is a block diagram illustrating an example deep neural network (DNN) model with bank-balanced sparse activation feature maps according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following definitions apply to the elements and operations described herein. These definitions help depict embodiments of the present disclosure and are not meant to be construed as limiting.

Acceleration—referred to changing a DNN such that the number of arithmetic operations required for computing the DNN function is reduced.

Bank-balanced sparse weights—a sparse pattern balanced among one or more banks of weights such that the number of non-zero weight elements in each bank is the same. The bank-balanced-sparsity is applied to weights of a layer of a DNN model.

Bank-balanced-sparse activation—a sparse pattern balanced among one or more banks of a feature map such that the number of non-zero output activation elements in each bank is the same. The bank-balanced sparsity is applied to the output activation feature map of a layer of a DNN model.

Deep neural network (DNN) model—A deep neural network (DNN) model is a composite function composed of several layers of elementary functions, where each function takes the output of previous layers as input and computes a new set of outputs. The outputs of each layer are termed as neurons, and a neuron is activated (or active) if it has a non-zero value, and is deactivated (or inactive) otherwise.

Objective function—referred to a function that is optimized during training by measuring how well a DNN performs on a particular task with respect to a particular training data set.

Sparsification (sparsify)—referred to a methodology of training a DNN (i.e., tuning the parameters of a DNN) such that the number of Activated Neurons becomes significantly smaller (i.e. at least less than half, typically less than a quarter) than the total number of Neurons.

Tensor—refers to a data structure such as a vector and matrix of any dimensions to store parameters of a neural network.

Embodiments disclose bank-balanced-sparse activation neural network models and methods to generate bank-balanced-sparse activation neural network models. According to one aspect, a neural network sparsification engine determines a first deep neural network (DNN) model having two or more hidden layers. The engine determines a bank size, a bank layout, and a target sparsity. The engine segments the activation feature maps into a plurality of banks based on the bank size and the bank layout. The engine generates a second DNN model by increasing a sparsity for each bank of activation feature map based on the target sparsity, wherein the second DNN model is used for inferencing.

According to a second aspect, a bank-balanced-sparse activation deep neural network (DNN) model is disclosed. The bank-balanced-sparse activation DNN model includes an input layer, one or more hidden layers, and an output layer, where the one or more hidden layers are disposed between the input layer and the output layer, and each hidden layer is to output bank-balanced-sparse activation feature maps. The bank-balanced-sparse activation DNN model is generated by determining a first DNN model having one or more hidden layers; determining a bank size, a bank layout, and a target sparsity; segmenting the activation feature maps into a plurality of banks based on the bank size and the bank layout; and generating a second DNN model as the bank-balanced-sparse activation DNN model by increasing a sparsity for each bank of activation feature map based on the target sparsity, wherein the second DNN model is used for inferencing.

FIG. 1 is a block diagram illustrating an example deep neural network (DNN) model with bank-balanced sparse activation feature maps according to one embodiment. Referring to FIG. 1, DNN model 100 includes a deep neural network model having one or more inner/hidden layers 101-103 disposed between an input layer 111 and an output layer 113. Each of the inner layers 101-103 can have one or more tensors of weights/bias (not shown) and activation functions (not shown) which, when multiplied with input feature maps 111, 123-125, generates output activation feature maps 123-125, 113 for the respective layers. Here, one or more output activation feature maps are bank-balanced sparse feature maps (bank-balanced sparse feature maps are further discussed below). The types of DNN models include, but are not limited to convolutional NN, where each of the layers are fully connected to a previous layer and a next layer, partially connected DNN, recurrent NN, long short-term memory (LSTM) DNN model, etc. Although some embodiments may be described with the DNN of FIG. 1, the scope of the types of DNN models should not be construed as limited.

Figure 2A:
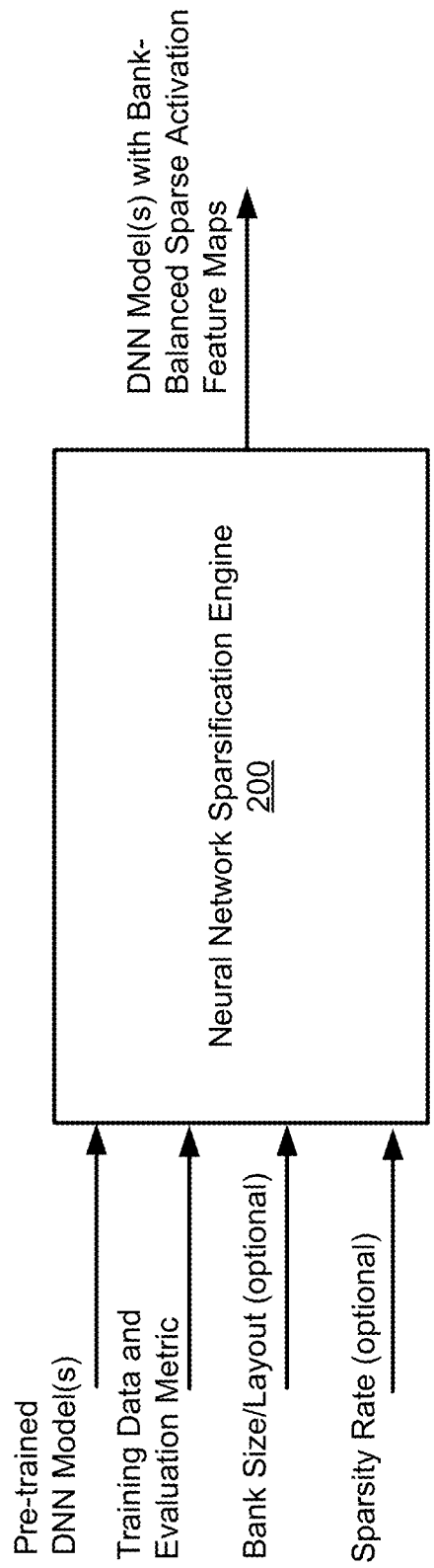
FIGS. 2A-2B are block diagrams illustrating a neural network sparsification engine according to one embodiment.
Figure 2B:
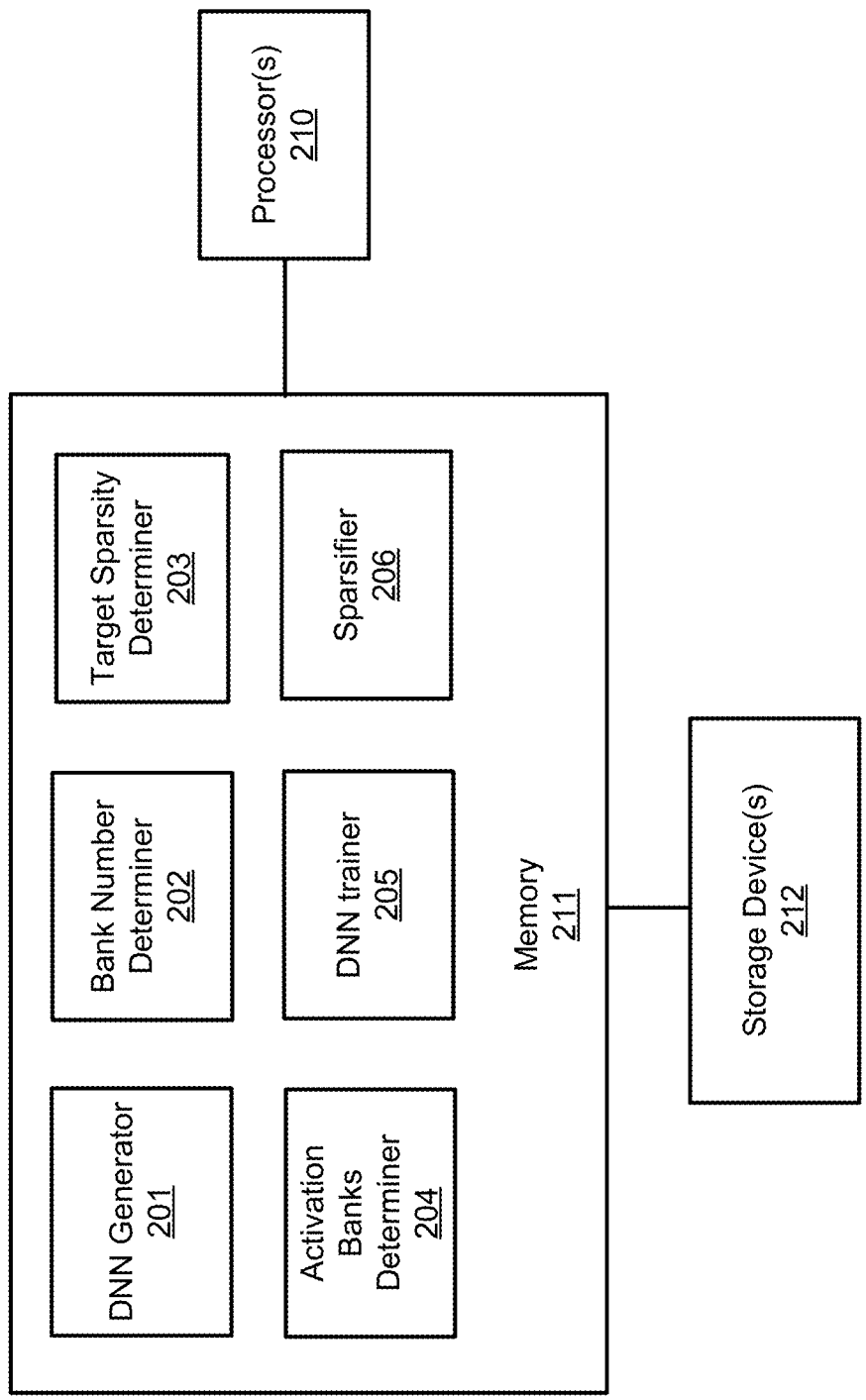

FIGS. 2A-2B are block diagrams illustrating a neural network sparsification engine according to one embodiment. Referring to FIGS. 2A-2B, neural network sparsification engine 200 can generate a bank-balanced sparse DNN model. In one embodiment, neural network sparsification engine 200 include inputs: training data and evaluation metric (e.g., objective function), a pre-trained DNN model (optional), a bank number, a sparsity rate, and outputs: a DNN model with bank-balanced sparse activation feature maps. In one embodiment, engine 200 may generate the pre-trained DNN model based on the input training data and the evaluation metric (e.g., an objective function).

In one embodiment, the bank size, the bank layout, and the sparsity rate are set with default or initial values, e.g., bank size=2, 4, 8, 16; bank layout=column, row, channel; sparsity rate=20%, 40%, 60%, etc. In another embodiment, the bank size, the bank layout, and the sparsity rate are configurable by a user for a device/system having engine 200. In another embodiment, the bank size/layout and the sparsity rate are auto-configurable based on one or more hyperparameters/types/dimensions of tensors of the neural networks. For example, for a natural language processing DNN, the dimensions of a tensor of the neural network may be sentence length by word embedding i.e. the vectors of each word with their associated sentiment.

Figure 5A:
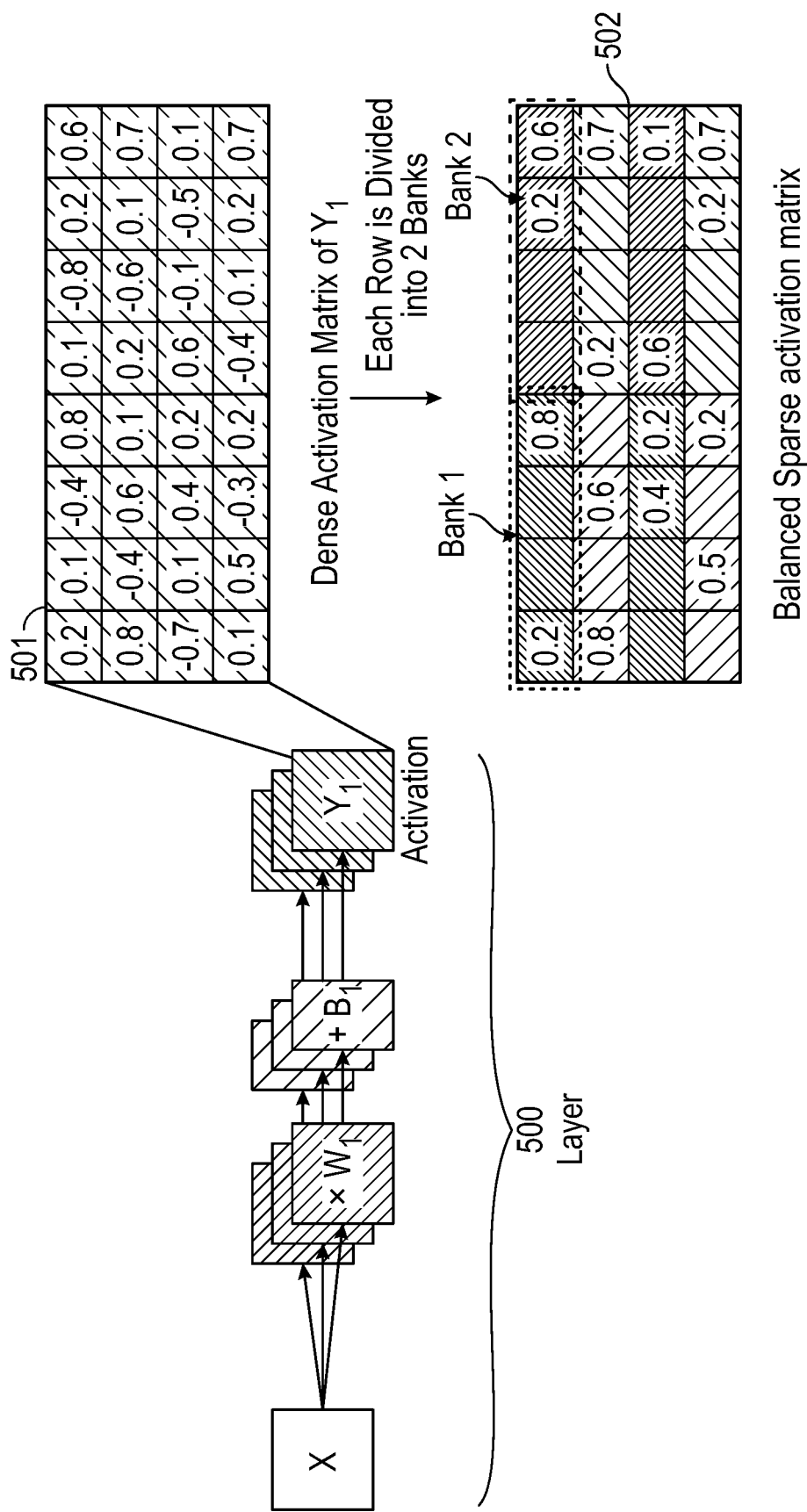
FIG. 5A is a block diagram illustrating a bank-balanced-sparse activation tensor for a layer of a DNN according to one embodiment.

Here, the bank number for a first dimension may be determined based on the sentence length dimension, such as, bank number=sentence length div val, where val is a numeric number representing the bank size. The bank number for a second dimension may be determined based on the word embedding dimension, such as bank number=word embedding div val, where val is a numeric number representing the bank size. An example of a bank-balanced activation with bank size=4 is shown in FIG. 5A, and an example of a bank-balanced activation with bank size=2 in shown in FIG. 5B. The sparsity rate can be set to a default value. For example, the sparsity rate may be set to 50% percent. In another embodiment, the sparsity rate may be auto-configured to increase so long as the evaluation metric (objective function) converges without adjusting the weight/bias of the DNN model, e.g., the output results are within a predetermined threshold for a predetermined number of iterations.

Referring to FIG. 2B, in one embodiment, neural network sparsification engine 200 may be implemented as part of a data processing system, a server, a computing system, an edge device, etc. Engine 200 can generate a bank-balanced sparse deep neural network model, such as model 100 of FIG. 1. Referring to FIG. 2B, engine 200 may include modules such as DNN generator 201, bank number determiner 202, target sparsity determiner 203, activation banks determiner 204, DNN trainer 205, and sparsifier 206.

In one embodiment, DNN generator 201 can generate a DNN model based on one or more training datasets and objective function. The training data can include input data and output labels for particular tasks (e.g., classification, object detection, facial recognition, language processing, etc.). In one embodiment, DNN generator 201 can generate a sparse DNN model based on a pre-trained DNN model. Bank number determiner 202 can determine the bank values/numbers based for the banks of output activation feature maps so the banks are retrievable based on the bank numbers. Target sparsity determiner 203 can determine a target sparsity (such as 20% 40%, 60%, 80%, etc.) for a sparse DNN model. Activation banks determiner 204 can group/divide the feature maps into a number of banks based on the bank size/layout. Note, each neural network layer outputs activation feature maps and the output activation feature maps are inputs to a next layer.

DNN trainer 205 can train a DNN model or retrain a DNN model by forward and backward propagation. Sparsifier 206 can apply sparsification to a DNN model by applying sparsification to weights or activation feature maps of any layers of the DNN model. Note that some or all of modules 201-206 may be implemented in software, hardware, or a combination thereof. For example, these modules may be installed in storage device(s) 212, loaded into memory 211, and executed by one or more processor(s) 210. Some of modules 201-206 may be integrated together as an integrated module.

Figure 3:
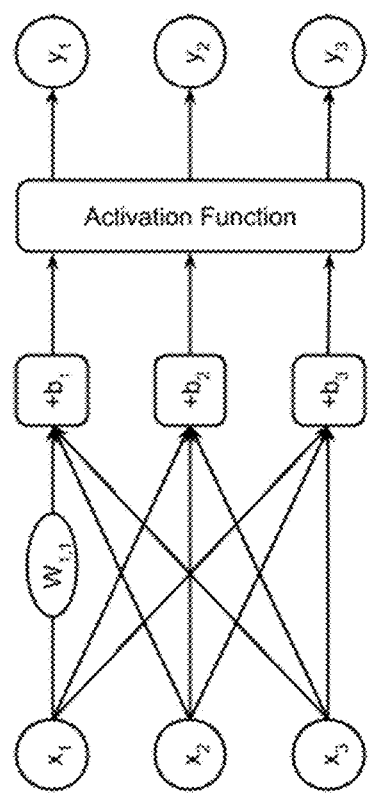
FIG. 3 is a block diagram illustrating a layer of a DNN model according to one embodiment.

FIG. 3 is a block diagram illustrating a layer of a DNN model according to one embodiment. Layer 300 may be a layer from a deep neural network, such as layer 101 of FIG. 1. Referring to FIG. 3, layer 300 can be represented by y=activation_fn(Wx+b), where x represents an input tensor, y represents an output tensor (or output activation feature maps), W represents a tensor of weights, b represents a bias tensor, and the activation_fn represents an activation function. Examples of activation functions include ReLu, Sigmoid, tanh, etc.

Figure 4:
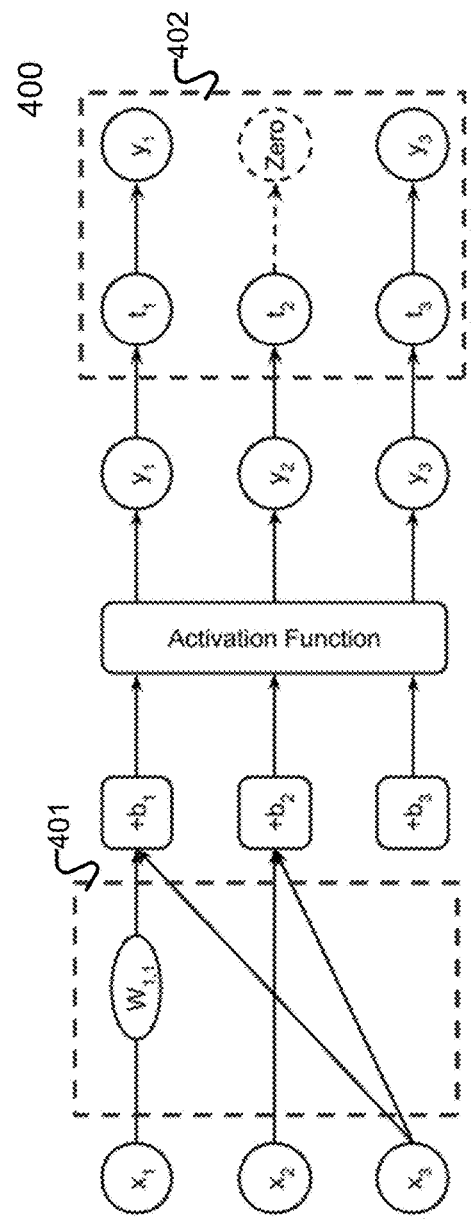
FIG. 4 is a block diagram illustrating activation feature maps sparsification by updating the weights for a layer of a DNN model according to one embodiment.

FIG. 4 is a block diagram illustrating activation feature maps sparsification for a layer of a DNN by updating the weights of a layer according to one embodiment. Layer 400 may represent layer 300 of FIG. 3 but with activation pruning (or activation sparsification). Referring to FIG. 4, for activation pruning, one or more activation feature maps (e.g., output y) is set to zero based on a target sparsity. E.g., y=activation_fn(Wx+b)·t, where t is a mask for output tensor for activation_fn(Wx+b) for the layer, "·" is a mathematical elementwise product operation, and y is the output. Here, the weight values 401 may be updated, e.g., W-->W', wherein W' is the updated weight tensor. Based on the new weight tensor, the activation feature map is: y'=activation_fn(W'x+b), where y' is the output activation. Here, the activation-pruned DNN model, e.g., a DNN model with pruned activation tensors (i.e. feature maps) for one or more layers, would use a fewer number of computations (e.g., multiplication and/or addition) for inference leading to a faster and more efficient DNN model. Note that mask t is a binary vector that is derived dynamically based on the input x, and t, where t is a function of activation_fn(Wx+b).

An example of mask t may be obtained by picking the top-k entries of each bank of tensor, activation_fn(Wx+b), and set the elements corresponding to the top-k of each bank to 1 and set elements corresponding to the others to 0. This results in a total number of k*number_of_banks of non-zero elements.

In one embodiment, for a DNN model with L layers having output feature maps $Y_i \in \mathbb{R}^{c_i \times n \times d_i}$ at the i-th layer. In one embodiment, activation pruning can be represented as masks: $T_i \in \mathbb{R}^{c_i \times n \times d_i}$, where i=1, . . . , L−1; $c_i$, n, and $d_i$ are the dimensions of a three-dimensional (3D) output feature maps given the output feature maps are 3D tensors.

FIG. 5A is a block diagram illustrating a bank-balanced sparse activation tensor for a layer of a DNN according to one embodiment. Referring to FIG. 5A, layer 500 can represent layer 400 of FIG. 4. In one embodiment, layer 500 outputs a dense activation matrix $Y_1$ that represents the activation feature map tensor 501, prior to activation sparsification. For one example, for a bank size=4, bank layout=row, and a target sparsity rate=50%, a sparsification engine (such as engine 200 of FIGS. 2A-2B) can generate a bank-balanced sparse feature map 502 based on feature map 501. Note that a sparse activation can provide hardware acceleration.

In one embodiment, feature map 501 is generated by determining a dimension to apply the sparsification. Referring to FIG. 5A, in this example, engine 200 may be auto-configured to apply sparsification to a row dimension as the bank layout. Here, engine 200 divides each row of feature map according to a bank size, in this case, bank size=4 results in Bank 1 and Bank 2. For each bank, engine 200 ranks the values from greatest to smallest. For example, Bank 1 has the ranked values as 0.8, 0.2, 0.1, −0.4. Based on a target sparsity rate, the largest values are selected as the activation values and the rest are set to zero. Here, 0.8 and 0.2 are selected as the activation values for Bank 1 and the rest of the values are set to zero (i.e., deactivated) for a 50% target sparsity rate.

Engine 200 applies the selection process for the remaining banks for layer 500 to generate feature map 502. In one embodiment, the selection is performed gradually and/or iteratively, e.g., a single activation value is zeroed from a single bank at a time. In another embodiment, the activation values are zeroed based on a threshold value, e.g., activation values in a bank is set to zero if less than the threshold value. In one embodiment, each bank has a distinct threshold value.

Figure 5B:
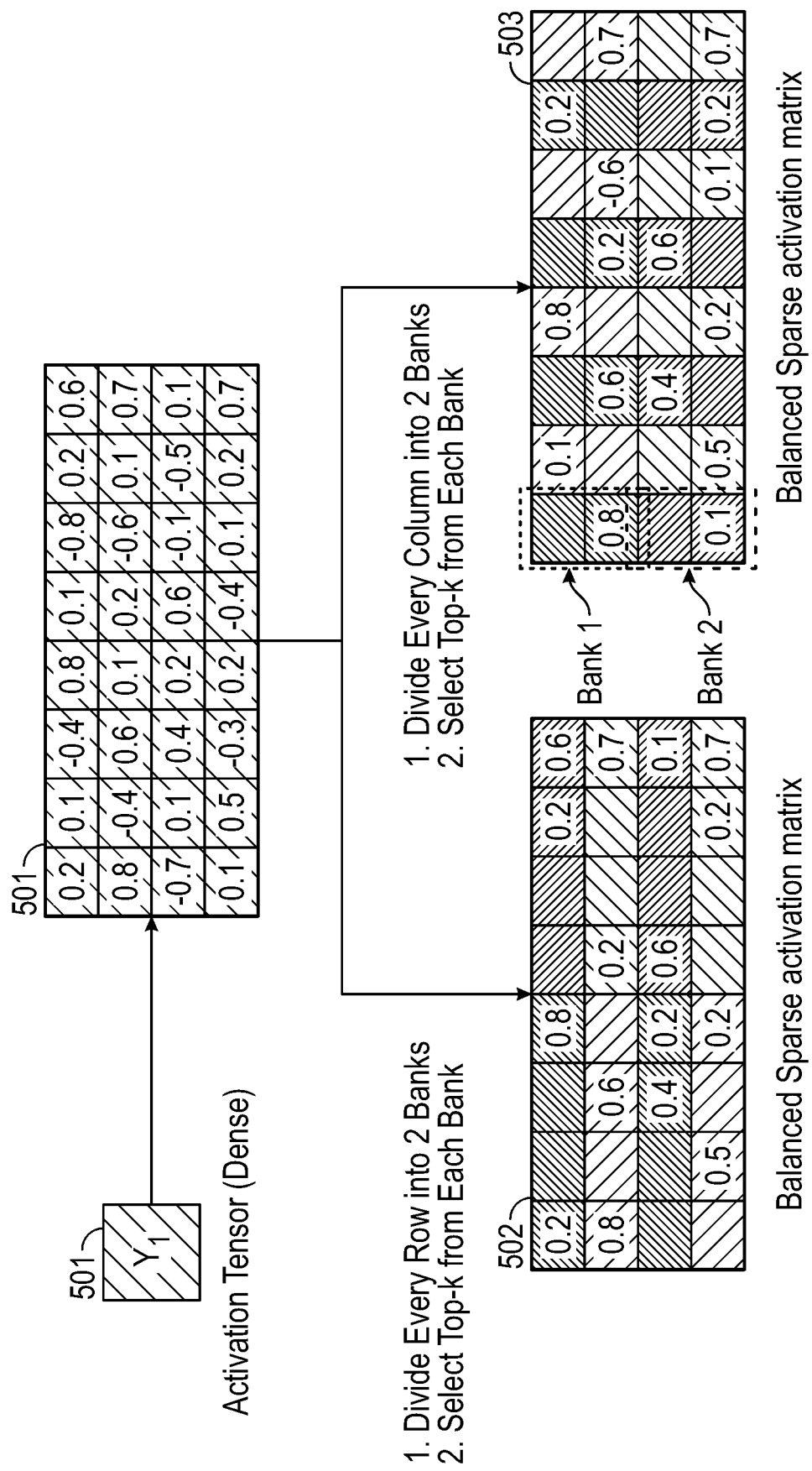
FIG. 5B is a block diagram illustrating another example of bank-balanced sparse activation tensor for a layer of a DNN model according to one embodiment.

FIG. 5B is a block diagram illustrating a bank-balanced sparse activation tensor for a layer of a DNN according to another embodiment. Referring to FIG. 5B, tensor 503 illustrates bank-balanced sparsification applied to a column dimension of tensor 501 (here, engine 200 may be configured by a user to apply sparsification to a column dimension). Referring to FIG. 5B, each column is divided into a top (Bank 1) and bottom bank (Bank 2) based on a bank size/layout, such as bank size=2 and bank layout=column. For each bank, the activation values can be sorted and the top k activations are retained, while the rest is set to zero.

For example, based on a target sparsity rate of 50%, each bank with two activation values are reduced to one activation value (the 50% target rate) to generate bank-balanced-sparse feature map 503. In one embodiment, the dimension (or component) to sparsify, the bank size/layout, and/or the sparsity rate may be configured by an operator of an accelerator/processing system/server/edge device using engine 200. In another embodiment, the dimension, bank size/layout, and/or the sparsity rate may be auto-configurable based on dimensions/components or hyperparameters of tensor 501.

Figure 6:
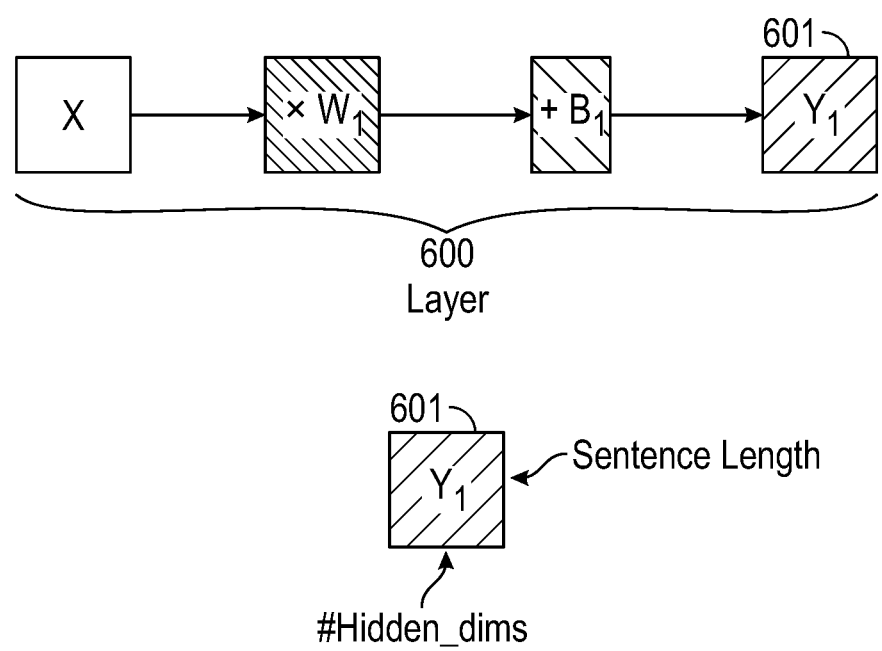
FIG. 6 is a block diagram illustrating an activation tensor with two-dimensions according to one embodiment.

FIG. 6 is a block diagram illustrating an activation tensor with two-dimensions (2D) according to one embodiment. Referring to FIG. 6, layer 600 may represent layer 500 of FIG. 5A, and tensor 601 may represent tensor 501 of FIG. 5A. Referring to FIG. 6, for one embodiment, layer 600 outputs a 2D activation tensor 601. In this case, tensor 601 can be an activation tensor for a natural language processing deep neural network and tensor 601 includes the dimensions: sentence length and hidden dims (dimensions). The hidden dims can include a dimension for word embedding, or any other dimensional values for natural language processing deep neural networks.

Figure 7:
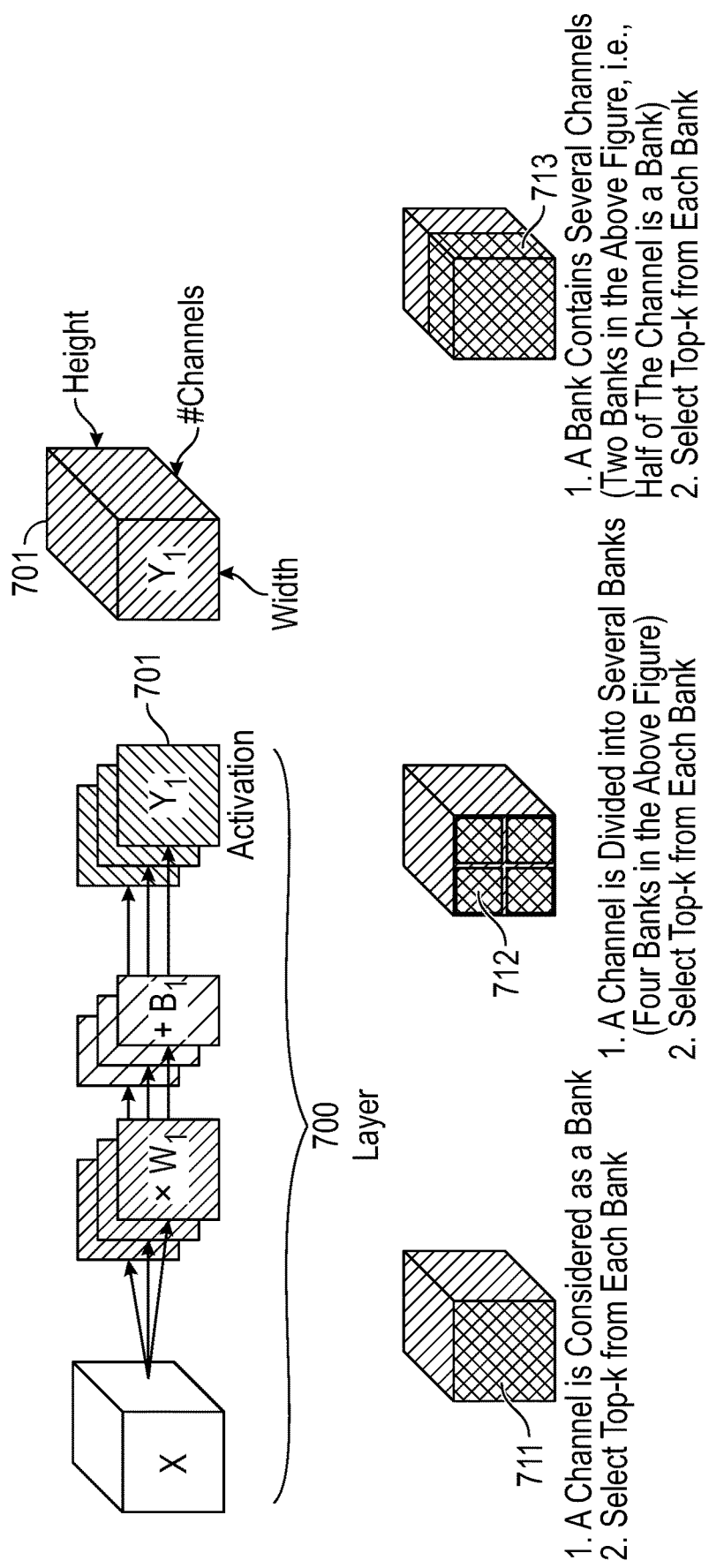
FIG. 7 is a block diagram illustrating three examples of bank arrangements for an activation tensor with three-dimensions according to some embodiments.

FIG. 7 is a block diagram illustrating an activation tensor with three-dimensions (3D) according to one embodiment. Referring to FIG. 7, layer 700 may represent layer 500 of FIG. 5A, and tensor 701 may represent tensor 501 of FIG. 5A. Referring to FIG. 7, for one embodiment, layer 700 outputs a 3D activation tensor 701. In this case, tensor 701 can be an activation tensor for an image recognition/classification deep neural network and tensor 701 includes the dimensions: height, width, and channels. For example, a red-green-blue (RGB) image includes the channels red, green, blue and each channel includes an image of size height×width. For an RGB image with depth, the channels can include red, green, blue, and depth. Note that different layers of a neural network can generate activation outputs having different number of channels, height, and/or width dimensions.

Referring to FIG. 7, in one embodiment, the banks can be auto-configured based on the number of color channels for a respective activation feature map. Here, each channel (e.g., channel 711) can be considered as a bank and top k values can be selected from each bank based on a target sparsity rate to generate a bank-balanced sparse activation. In another embodiment, the banks can be auto-configured or configured by an operator. In another embodiment, a channel can be divided into several banks (e.g., channel 712 is divided into 4 banks). Next, top k values can be selected from each bank based on a target sparsity rate to generate a bank-balanced sparse activation. In another embodiment, several channels can be combined as one bank (e.g., bank 713 includes two or more channels). Similarly, top k values can be selected from each bank based on a target sparsity rate to generate a bank-balanced sparse activation. Although two and three dimensional activation tensors are shown, the activation tensors can be of any dimensions, e.g., 4, 5, 6, etc.

Figure 8:
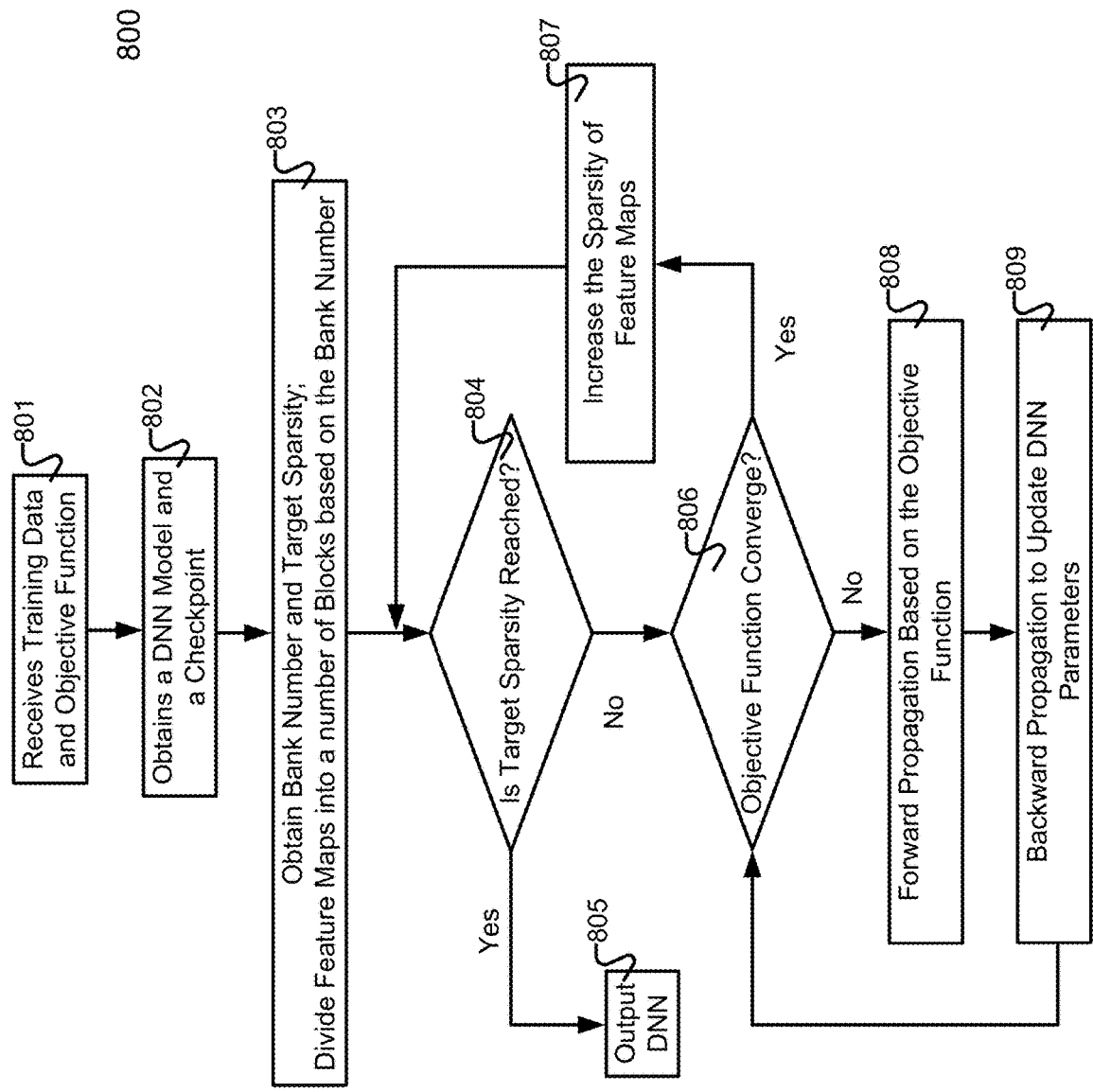
FIG. 8 is a flow diagram illustrating a process to generate a bank-balanced sparse DNN according to one embodiment.

FIG. 8 is a flow diagram illustrating a process to generate a bank-balanced sparse DNN according to one embodiment. Process 800 may be performed by processing logic which may include software, hardware, or a combination thereof. For example, process 800 may be performed by a neural network sparsification engine 200 of FIG. 2A, such as an accelerator, a processor, a server, an edge device, or a host system with engine 200. Referring to FIG. 8, at block 801, processing logic receives training data and an objective function for a neural network model. The training data may include one or more datasets for neural network training. The training data can be a set of examples used to fit neural network model parameters (e.g. weights and bias connections between neurons of the neural network model). The objective function describes the inference objectives (e.g., classification, object recognition tasks) and can include evaluation criteria to determine how well the network model parameters fit the training data for the particular objectives.

At block 802, processing logic obtains a DNN model (e.g., first DNN model) and a checkpoint. The DNN model can be obtain by performing a training to the objective function using a training data or the DNN model can be a pre-trained DNN model. The checkpoint may include a checkpoint with an accuracy percentage for a particular task (e.g., 89%) when a particular training dataset is applied to the DNN model. In one embodiment, a target sparsity rate may be automatically reconfigured based on the checkpoint. E.g., a target sparsity rate may initially be set to 80% and if a sparsified DNN model generated based on the target sparsity having the target sparsity rate retains an accuracy percentage for the particular task within a predetermined threshold to the checkpoint, the target sparsity is automatically increased to generate a next sparsified DNN model. The auto-reconfiguration of the target sparsity rate can repeat. This way, a target sparsity can be automatically selected for a DNN for an optimal acceleration.

At block 803, processing logic obtains one or more bank sizes/layouts (to derive the bank numbers) and a target sparsity value. The bank size/layout/target sparsity can be individually specified for each layer of the DNN or the same bank size/layout/sparsity can be applied to each layer of the DNN model. In one embodiment, the bank size/layout derives a number of banks that is divisible by a tensor dimension of an activation tensor of the DNN model. The target sparsity value can be a percentage value, such as 40%, 50%, 60%, etc. At block 803, processing logic further divides the activation feature maps (e.g., output of a layer) into a number of banks based on the bank size/layout. Processing logic then determines a sparsity rate for each bank.

At block 804, processing logic evaluates if a target sparsity is reached based on the sparsity rate for each bank. If yes, then the process proceeds to block 805 and outputs the DNN model as the DNN model of bank-balanced—sparse-activation (e.g., a second DNN model). If not, process logic proceeds to block 806. At block 806, processing logic determines if the objective function converges. In one embodiment, the objective function converges if a change in the last predetermined number of iterations are within a predetermined threshold range. E.g., last ten iterations the modified DNN model generates outputs that is within a 0.1% threshold range. If the objective function output is within the predetermined threshold range, e.g., converges, processing logic proceeds to block 807. If the objective function fails to converge, processing logic proceeds to block 808.

At block 807, processing logic increases a sparsity of the activation feature maps for a respective layer. Here, activation feature maps sparsity is increased by zeroing or removing an activation value from a bank. For example, referring to FIG. 5A, Bank 1 row 1 has activation values 0.2, 0.1, −0.4, and 0.8. The sparsity is increased by removing the −0.4 for a sparsity rate of 75%. In one embodiment, activation values are removed from a bank of a layer while keeping the layer bank-balanced. In one embodiment, a threshold value may be set for a bank and the threshold value can be adjusted gradually to gradually remove activation values which are less than threshold value. In one embodiment, a sparsity is increased by removing activation values from each bank of each layer of the DNN model. Once sparsity is increased, processing logic then proceeds to block 804 and determines if a target sparsity is reached for the layer/DNN model.

At block 808, if the objective function fails to converge (e.g., changes in the last predetermined number of iterations is outside of the predetermined threshold range), processing logic forward propagates the DNN model based on the objective function. Here, input data (e.g., a subset of the training data) is fed in the forward direction through the DNN model. Each hidden layer accepts the input data, processes it and passes an output to a successive layer. In one embodiment, weight/bias and outputs computed for each layer are stored to be used for backward propagation.

At block 809, processing logic backward propagates the DNN model. Here, processing logic calculates the layer output values backwards through the network in order to compute a gradient (e.g., differences for the output values from the forward propagation). In one embodiment, processing logic loops over the layers starting with the final layer in reverse topological in order to compute the derivative of the final layer output with respect to each layer. This way, processing logic can determine which weight/bias values is responsible for most errors and the weights/bias can be updated based on such determination. Once the weight/bias values are updated, process logic proceeds to block 806. In one embodiment, process logic iteratively or gradually sparsifies the DNN model as illustrated by blocks 804 and 806-809 until the DNN model reaches a target sparsity.

Figure 9:
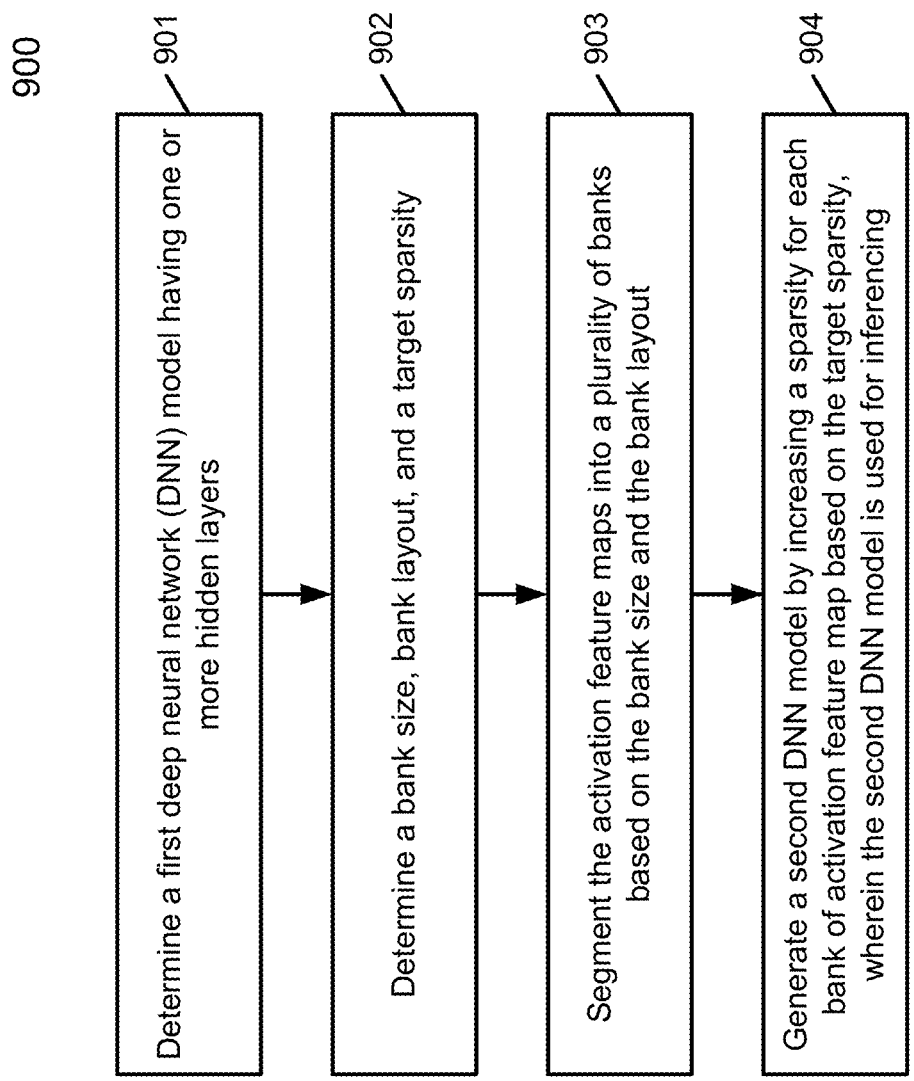
FIG. 9 is a flow diagram illustrating a method according to one embodiment.

FIG. 9 is a flow diagram illustrating a method according to one embodiment. Process 900 may be performed by processing logic which may include software, hardware, or a combination thereof. For example, process 900 may be performed by a neural network sparsification engine 200 of FIG. 2A, or an accelerator, a processor, a server, an edge device, or a host system having engine 200. Referring to FIG. 9, at block 901, process logic determines a first deep neural network (DNN) model having one or more hidden layers. At block 902, processing logic determines a bank size, a bank layout, and a target sparsity. At block 903, processing logic groups the activation feature maps into a number of banks based on the bank size and the bank layout. At block 904, processing logic generates a second DNN model by increasing a sparsity for each bank of activation feature map based on the target sparsity, where the second DNN model is used for inferencing.

In one embodiment, the second DNN model is generated by, for each bank of activation feature map, increasing the sparsity for the bank of activation feature map gradually until the bank of activation feature map reaches the target sparsity and retraining the second DNN model to ensure the second DNN model converges in response to increasing the sparsity for the bank of activation feature map. In one embodiment, grouping the activation feature maps includes grouping the activation feature maps into a number of banks based on the bank layout, e.g., a row dimension or a column dimension of an activation tensor for a layer of the first DNN model if the activation tensor is a two dimensional tensor; and grouping the activation feature maps into a number of banks based on a channel dimension or a row dimension or a column dimension (e.g., the bank layout) of an activation tensor for a layer of the first DNN model if the activation tensor is a three or more dimensional tensor.

In one embodiment, retraining the second DNN model includes calculating an output for an objective function by forward propagation, and updating a weight parameter for each hidden layer of the DNN model by back propagation based on the calculated output. In one embodiment, the second DNN model is a bank-balanced-sparse DNN model.

In one embodiment, the second DNN model is a dynamic DNN model, wherein weight parameters of the second DNN model for a first inference is different than weight parameters for a second inference. In one embodiment, the sparsity for each activation feature map block is increased gradually by retaining top-k values from each bank and zeroing the remaining values gradually for the bank, where k is equal to or greater than 1.

In one embodiment, a bank-balanced-sparse activation deep neural network (DNN) model includes an input layer, one or more hidden layers, and an output layer. The one or more hidden layers are disposed between the input layer and the output layer, and each hidden layer is to output bank-balanced-sparse activation feature maps. The bank-balanced-sparse activation DNN model is generated by determining a first DNN model having one or more hidden layers, determining a bank size, a bank layout, and a target sparsity, grouping the activation feature maps into a plurality of banks based on the bank size and the bank layout, and generating a second DNN model as the bank-balanced-sparse activation DNN model by increasing a sparsity for each bank of activation feature map based on the target sparsity, wherein the second DNN model is used for inferencing.

In one embodiment, the second DNN model is generated by, for each bank of activation feature map, increasing the sparsity for the bank of activation feature map gradually until the bank of activation feature map reaches the target sparsity and retraining the second DNN model to ensure the second DNN model converges in response to increasing the sparsity for the bank of activation feature map. In one embodiment, grouping the activation feature maps includes grouping the activation feature maps into a number of banks based on a row dimension or a column dimension of an activation tensor for a layer of the first DNN model if the activation tensor is a two dimensional tensor; and grouping the activation feature maps into a number of banks based on a channel dimension or a row dimension or a column dimension of an activation tensor for a layer of the first DNN model if the activation tensor is a three or more dimensional tensor.

In one embodiment, retraining the second DNN model includes calculating an output for an objective function by forward propagation, and updating a weight parameter for each hidden layer of the DNN model by back propagation based on the calculated output. In one embodiment, the second DNN model is a bank-balanced-sparse DNN model.

In one embodiment, the second DNN model is a dynamic DNN model, wherein weight parameters of the second DNN model for a first inference is different than weight parameters for a second inference. In one embodiment, the sparsity for each activation feature map block is increased gradually by retaining k top values from each bank and zeroing the remaining values gradually for the bank, where k is equal to or greater than 1.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method to generate a deep neural network (DNN) model, comprising:
   determining a first deep neural network (DNN) model having one or more hidden layers;
   determining a bank size, a bank layout, and a target sparsity, the target sparsity specifying a sparsity for a bank of an activation feature map for the one or more hidden layers;
   generating a second DNN model based on the first DNN model, wherein a hidden layer of the second DNN model includes a dynamic mask to mask an activation feature map of the hidden layer; and
   retraining the second DNN model by:
      determining an output tensor corresponding to an activation feature map at a corresponding hidden layer of the second DNN model;
      determining a plurality of banks based on the bank size and the bank layout for the output tensor, wherein the output tensor includes the plurality of banks based on the bank size and the bank layout;
      computing the dynamic mask based on the output tensor;
      applying the dynamic mask to the output tensor by performing component-wise multiplication between the output tensor corresponding to the activation feature map and the mask; and
      increasing a sparsity for each of the plurality of banks in the output tensor until the sparsity is equal to or greater than the target sparsity while ensuring the second DNN model converges, wherein the second DNN model includes activations among the plurality of banks at the output tensor such that a number of non-zero elements in each of the plurality of banks is the same and the second DNN model is used for inferencing.

2. The method of claim 1, wherein retraining the second DNN model comprises:
   for each bank of activation feature map, increasing the sparsity for the bank of activation feature map gradually until the bank of activation feature map reaches the target sparsity.

3. The method of claim 1, wherein determining the plurality of banks based on the bank size and the bank layout comprises:
   determining the plurality of banks based on a row dimension or a column dimension of an activation tensor for a layer of the first DNN model if the activation tensor is a two-dimensional (2D) tensor, or
   determining the plurality of banks based on a channel dimension, a row dimension, or a column dimension of an activation tensor for a layer of the first DNN model if the activation tensor is a three or more dimensional tensor.

4. The method of claim 2, wherein retraining the second DNN model comprises:
   calculating an output for an objective function by forward propagation; and
   updating a weight parameter for each hidden layer of the second DNN model by back propagation based on the calculated output.

5. The method of claim 1, wherein the second DNN model includes an output tensor having two banks at each row, each bank meeting the target sparsity and is balanced among the banks of each row, or wherein the second DNN model includes an output tensor having two banks at each column, each bank meeting the target sparsity and is balanced among the banks of each column.

6. The method of claim 1, wherein the second DNN model is a dynamic DNN model, wherein weight parameters of the second DNN model for a first inference is different than weight parameters for a second inference.

7. The method of claim 2, wherein the sparsity for each bank of activation feature map is increased gradually by retaining top-k values from each bank and zeroing remaining values gradually for the bank, wherein k is equal to or greater than 1.

8. A non-transitory machine-readable medium having instructions stored therein, which when executed by a processor, cause the processor to perform operations, the operations comprising:
   determining a first deep neural network (DNN) model having one or more hidden layers;
   determining a bank size, a bank layout, and a target sparsity, the target sparsity specifying a sparsity for a bank of an activation feature map for the one or more hidden layers;
   generating a second DNN model based on the first DNN model, wherein a hidden layer of the second DNN model includes a dynamic mask to mask an activation feature map of the hidden layer; and
   retraining the second DNN model by:
      determining an output tensor corresponding to an activation feature map at a corresponding hidden layer of the second DNN model;
      determining a plurality of banks based on the bank size and the bank layout for the output tensor, wherein the output tensor includes the plurality of banks based on the bank size and the bank layout;
      computing the dynamic mask based on the output tensor;
      applying the dynamic mask to the output tensor by performing component-wise multiplication between the output tensor corresponding to the activation feature map and the mask; and
      increasing a sparsity for each of the plurality of banks in the output tensor until the sparsity is equal to or greater than the target sparsity while ensuring the second DNN model converges, wherein the second DNN model includes activations among the plurality of banks at the output tensor such that a number of non-zero elements in each of the plurality of banks is the same and the second DNN model is used for inferencing.

9. The non-transitory machine-readable medium of claim 8, wherein retraining the second DNN model comprises:
   for each bank of activation feature map, increasing the sparsity for the bank of activation feature map gradually until the bank of activation feature map reaches the target sparsity.

10. The non-transitory machine-readable medium of claim 8, wherein determining the plurality of banks based on the bank size and the bank layout comprises:

determining the plurality of banks based on a row dimension or a column dimension of an activation tensor for a layer of the first DNN model if the activation tensor is a two dimensional (2D) tensor, or determining the plurality of banks based on a channel dimension, a row dimension, or a column dimension of an activation tensor for a layer of the first DNN model if the activation tensor is a three or more dimensional tensor.

11. The non-transitory machine-readable medium of claim 9, wherein retraining the second DNN model comprises:

calculating an output for an objective function by forward propagation; and updating a weight parameter for each hidden layer of the second DNN model by back propagation based on the calculated output.

12. The non-transitory machine-readable medium of claim 8, wherein the second DNN model includes an output tensor having two banks at each row, each bank meeting the target sparsity and is balanced among the banks of each row, or wherein the second DNN model includes an output tensor having two banks at each column, each bank meeting the target sparsity and is balanced among the banks of each column.

13. The non-transitory machine-readable medium of claim 8, wherein second DNN model is a dynamic DNN model, wherein weight parameters of the second DNN model for a first inference is different than weight parameters for a second inference.

14. The non-transitory machine-readable medium of claim 9, wherein the sparsity for each bank of activation feature map is increased gradually by retaining k top values from each bank and zeroing remaining values gradually for the bank, wherein k is equal to or greater than 1.

15. A computing apparatus comprising a memory having code stored therein, the code comprising: a bank-balanced-sparse deep neural network (DNN) model, the DNN model comprising:

an input layer;

one or more hidden layers; and an output layer, wherein the one or more hidden layers are disposed between the input layer and the output layer, and each hidden layer is to output an activation feature map, wherein the bank-balanced-sparse DNN model is generated by determining a first DNN model having one or more hidden layers, determining a bank size, a bank layout, and a target sparsity, the target sparsity specifying a sparsity for a bank of an activation feature map for the one or more hidden layers, generating a second DNN model based on the first DNN model, wherein a hidden layer of the second DNN model includes a dynamic mask to mask an activation feature map of the hidden layer; and retraining the second DNN model as the bank-balanced-sparse DNN model by:

determining an output tensor corresponding to an activation feature map at a corresponding hidden layer of the second DNN model, determining a plurality of banks based on the bank size and the bank layout for the output tensor, wherein the output tensor includes the plurality of banks based on the bank size and the bank layout, computing the dynamic mask based on the output tensor, and applying the dynamic mask to the output tensor by performing component-wise multiplication between the output tensor corresponding to the activation feature map and the mask; and increasing a sparsity for each of the plurality of banks in the output tensor until the sparsity is equal to or greater than the target sparsity while ensuring the second DNN model converges, wherein the second DNN model includes activations among the plurality of banks at the output tensor such that a number of non-zero elements in each of the plurality of banks is the same and the second DNN model is used for inferencing.

16. The apparatus of claim 15, wherein retraining the second DNN model comprises:

for each bank of activation feature map, increasing the sparsity for the bank of activation feature map gradually until the bank of activation feature map reaches the target sparsity.

17. The apparatus of claim 15, wherein determining the plurality of banks based on the bank size and the bank layout comprises:

determining the plurality of banks based on a row dimension or a column dimension of an activation tensor for a layer of the first DNN model if the activation tensor is a two dimensional (2D) tensor, or determining the plurality of banks based on a channel dimension, a row dimension, or a column dimension of an activation tensor for a layer of the first DNN model if the activation tensor is a three or more dimensional tensor.

18. The apparatusbank of claim 16, wherein retraining the second DNN model comprises:

calculating an output for an objective function by forward propagation; and updating a weight parameter for each hidden layer of the second DNN model by back propagation based on the calculated output.

19. The apparatus of claim 15, wherein the second DNN model includes an output tensor having two banks at each row, each bank meeting the target sparsity and is balanced among the banks of each row, or wherein the second DNN model includes an output tensor having two banks at each column, each bank meeting the target sparsity and is balanced among the banks of each column.

20. The apparatus of claim 15, wherein second DNN model is a dynamic DNN model, wherein weight parameters of the second DNN model for a first inference is different than weight parameters for a second inference.

21. The apparatus of claim 15, wherein the sparsity for each bank of activation feature map is increased gradually by retaining k top values from each bank and zeroing remaining values gradually for the bank, wherein k is equal to or greater than 1.

* * * * *